(12) United States Patent
Katagiyama et al.

(10) Patent No.: US 8,485,736 B2
(45) Date of Patent: Jul. 16, 2013

(54) OPTICAL CONNECTOR

(75) Inventors: Naoki Katagiyama, Tokyo (JP); Hideto Shimazu, Tokyo (JP); Hideo Sugimoto, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 13/614,258

(22) Filed: Sep. 13, 2012

(65) Prior Publication Data

US 2013/0011101 A1    Jan. 10, 2013

Related U.S. Application Data

(62) Division of application No. 12/773,149, filed on May 4, 2010, now Pat. No. 8,356,947.

(30) Foreign Application Priority Data

May 19, 2009 (JP) ................................. 2009-120779

(51) Int. Cl.
G02B 6/38 (2006.01)
G02B 6/26 (2006.01)

(52) U.S. Cl.
USPC .............................................. 385/60; 385/39

(58) Field of Classification Search
USPC .................................................. 385/60, 39
See application file for complete search history.

(56) References Cited

U.S. PATENT DOCUMENTS

| 5,280,552 | A | * | 1/1994 | Yokoi et al. | 385/78 |
|---|---|---|---|---|---|
| 5,325,455 | A | * | 6/1994 | Henson et al. | 385/89 |
| 5,436,995 | A | * | 7/1995 | Yoshizawa et al. | 385/86 |
| 5,537,501 | A | * | 7/1996 | Iwano et al. | 385/58 |
| 5,673,346 | A | * | 9/1997 | Iwano et al. | 385/60 |
| 6,349,918 | B1 | * | 2/2002 | Bunker | 248/635 |
| 6,583,902 | B1 | * | 6/2003 | Yuen | 398/135 |
| 6,848,836 | B2 | * | 2/2005 | Ueda et al. | 385/78 |
| 7,118,284 | B2 | * | 10/2006 | Nakajima et al. | 385/53 |
| 7,195,400 | B2 | * | 3/2007 | Asano et al. | 385/78 |
| 7,280,724 | B2 | * | 10/2007 | Yoshikawa | 385/52 |
| 7,572,065 | B2 | * | 8/2009 | Lu et al. | 385/78 |
| 7,654,748 | B2 | * | 2/2010 | Kuffel et al. | 385/60 |
| 2003/0142917 | A1 | * | 7/2003 | Merrick | 385/53 |
| 2003/0152331 | A1 | * | 8/2003 | Dair et al. | 385/59 |
| 2003/0161586 | A1 | * | 8/2003 | Hirabayashi | 385/78 |
| 2003/0215191 | A1 | * | 11/2003 | Taira et al. | 385/78 |
| 2004/0037517 | A1 | * | 2/2004 | Dair et al. | 385/92 |
| 2004/0074661 | A1 | * | 4/2004 | Schiaffino et al. | 174/52.5 |
| 2004/0105625 | A1 | * | 6/2004 | Ueda et al. | 385/78 |
| 2005/0141817 | A1 | * | 6/2005 | Yazaki et al. | 385/78 |

(Continued)

FOREIGN PATENT DOCUMENTS

JP    8-248263 A    9/1996

*Primary Examiner* — Kaveh Kianni
(74) *Attorney, Agent, or Firm* — Holtz, Holtz, Goodman & Chick, PC

(57) ABSTRACT

An optical connector which enables an operator to easily remove a ferrule from a housing without using a special jig by himself alone. A supporting member that is mounted in a housing in a manner capable of being inserted and removed in a state in which the ferrule is held therein, includes a supporting member main body which is accommodated in the housing, and an operating portion which temporarily releases an engagement between protrusions formed on the supporting member main body and through holes formed in the housing. The operating portion is arranged in a manner protruding outside the housing when the supporting member is mounted in the housing.

3 Claims, 18 Drawing Sheets

U.S. PATENT DOCUMENTS

| | | | |
|---|---|---|---|
| 2005/0180754 A1* | 8/2005 | Mizue et al. | 398/135 |
| 2005/0220424 A1* | 10/2005 | Asano et al. | 385/78 |
| 2005/0244109 A1* | 11/2005 | Yabe et al. | 385/92 |
| 2005/0276547 A1* | 12/2005 | Wang et al. | 385/92 |
| 2005/0286838 A1* | 12/2005 | Oki et al. | 385/92 |
| 2005/0286839 A1* | 12/2005 | Yoshikawa | 385/92 |
| 2006/0215970 A1* | 9/2006 | Mizue et al. | 385/92 |
| 2007/0286554 A1* | 12/2007 | Kuffel et al. | 385/60 |
| 2008/0175542 A1* | 7/2008 | Lu et al. | 385/62 |
| 2009/0003772 A1* | 1/2009 | Lu et al. | 385/60 |
| 2009/0148104 A1* | 6/2009 | Lu et al. | 385/72 |
| 2009/0162016 A1* | 6/2009 | Lu et al. | 385/72 |
| 2010/0034502 A1* | 2/2010 | Lu et al. | 385/60 |
| 2010/0266242 A1* | 10/2010 | Lu et al. | 385/53 |
| 2010/0290741 A1* | 11/2010 | Lu et al. | 385/60 |
| 2011/0047731 A1* | 3/2011 | Sugita et al. | 15/97.1 |
| 2012/0063724 A1* | 3/2012 | Kuffel et al. | 385/78 |

* cited by examiner

US 8,485,736 B2

OPTICAL CONNECTOR

BACKGROUND OF THE INVENTION

1. Field of the Invention

This invention relates to an optical connector.

2. Description of the Related Art

Conventionally, there has been proposed an optical receptacle provided with a housing comprised of an internal component and an external component for fixing the internal component to an inside thereof (see Japanese Laid-Open Patent Publication (Kokai) No. H08-248263).

A ferrule is supported by the internal component. An optical fiber cord is supported by the ferrule. A flange portion of the ferrule is locked to locking lugs of the internal component.

When the internal component is inserted in the hollow cylindrical external component, a locking protrusion formed on an outer peripheral surface of the internal component climbs over a locking protrusion formed on an inner peripheral surface of the external component, and then, the internal component is brought into abutment with a step formed on the inner peripheral surface of the external component. As a result, the internal component is fixed to the external component.

In the above-mentioned optical receptacle, to remove the ferrule from the housing, it is necessary to release the locked state between the flange portion of the ferrule and the locking lugs of the internal component of the housing, and draw out the ferrule from the internal component at the same time.

It is considered that a special jig is necessary to release the locked state between the flange portion of the ferrule and the locking lugs of the internal component of the housing. This is a cause of an increase in operation costs.

SUMMARY OF THE INVENTION

The present invention has been made in view of these circumstances, and an object thereof is to provide an optical connector which makes it possible to remove a ferrule from a housing without using a special jig.

To attain the above object, the present invention provides an optical connector comprising a housing that is connected to a mating optical connector, a supporting member that is mounted in the housing in a manner capable of being inserted and removed in a state in which a ferrule which holds an optical fiber wire is held therein, the supporting member including a supporting member main body which is accommodated in the housing, and an operating portion which is provided on the supporting member main body, and temporarily disables a retaining function of the retaining means, and retaining means for preventing the supporting member from being removed from the housing when the supporting member is mounted in the housing, wherein when the supporting member is mounted in the housing, the operating portion protrudes out from the housing.

With the arrangement of the optical connector according to the present invention, the supporting member includes the supporting member main body received in the housing, and the operating portion provided on the supporting member main body, which temporarily disables the retaining function of the retaining means, and when the supporting member is mounted in the housing, the operating portion protrudes out from the housing, and hence it is possible to temporarily disable the retaining function of the retaining means by manually operating the operating portion, whereby it is possible to easily draw out the supporting member from the housing. As a result, the ferrule is removed from the housing in a state supported by the supported member.

Preferably, the retaining means is formed by protrusions which are formed on the supporting member main body in a manner protruding toward the housing, and holes which are formed in the housing, and are capable of being engaged with the protrusions.

Preferably, the retaining means is formed by protrusions which are formed on the housing in a manner protruding toward the supporting member main body, and holes which are formed in the supporting member main body, and are capable of being engaged with the protrusions.

More preferably, the supporting member main body comprises a pair of elastic deformation portions which are opposed to each other across a receiving space for receiving an optical fiber cord, and are elastically deformable in a direction toward each other, and a connection portion which receives the ferrule and connects the pair of elastic deformation portions to each other, wherein one of a set of the protrusions and a set of the holes is formed on or in the pair of elastic deformation portions, wherein the other of the set of the protrusions and the holes is formed on or in the housing, and wherein the operating portion is formed by a pair of plate portions which are continuous with the pair of elastic deformation portions.

Further preferably, the connection portion is formed with an accommodating portion for accommodating a flange portion of the ferrule, and preventing the flange portion from moving in a direction of inserting or removing the supporting member.

According to this invention, it is possible to easily remove the ferrule from the housing by an operator alone.

The above and other objects, features and advantages of the present invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

A description will be given of an optical connector 1 according to a first embodiment of the present invention with reference to FIGS. 1 to 15.

Figure 1:
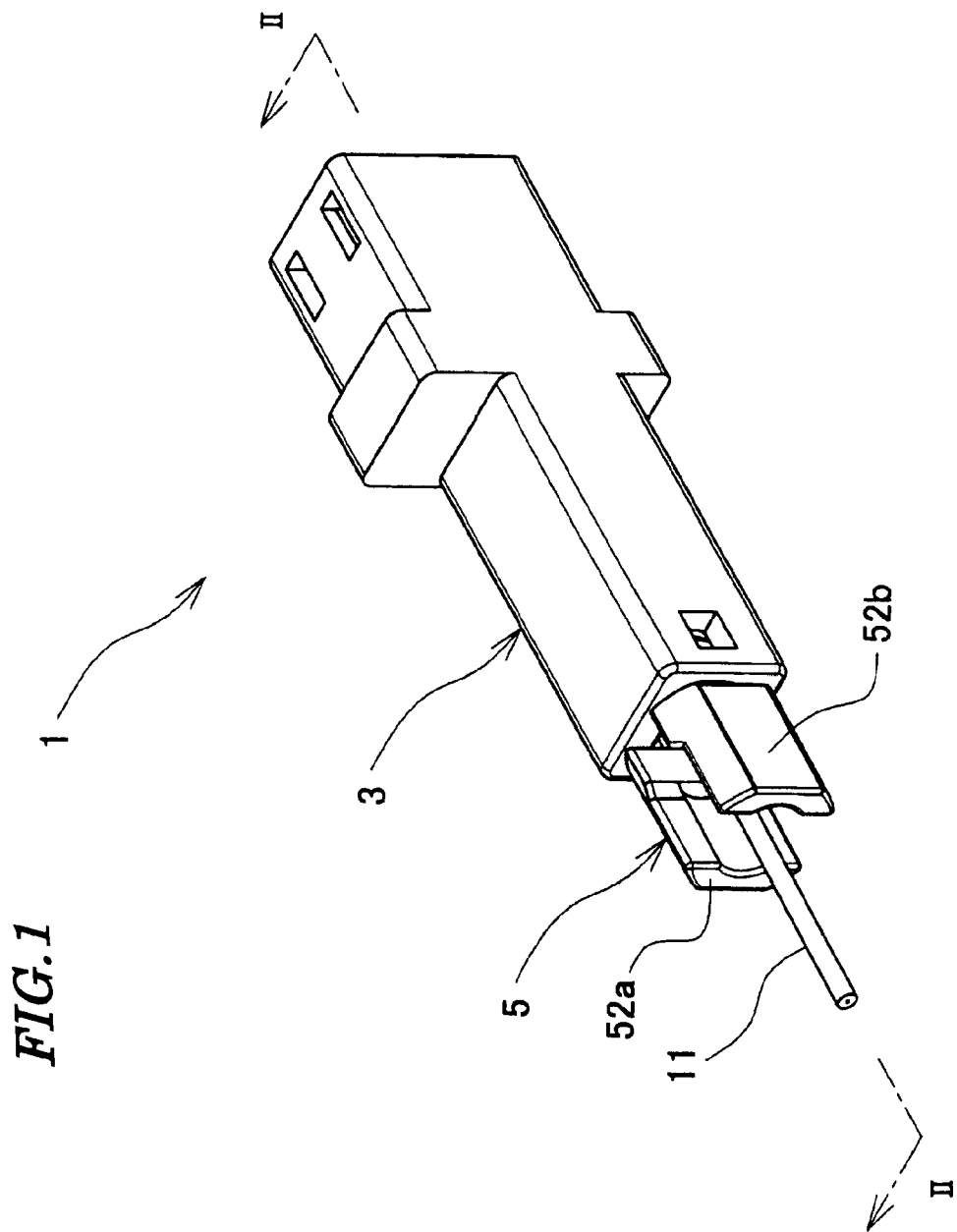
FIG. 1 is a perspective view of an optical connector according to a first embodiment of the present invention.
Figure 2:
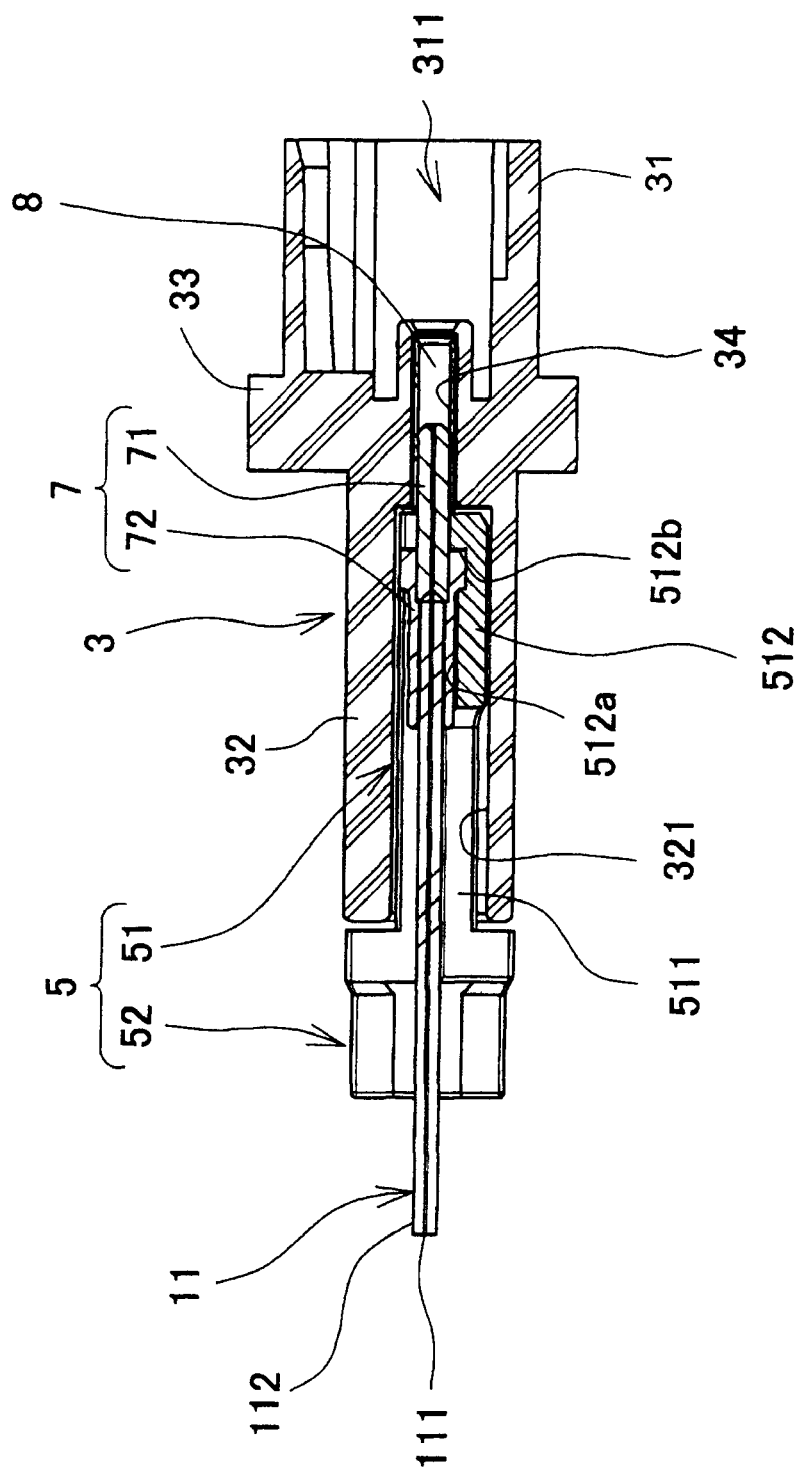
FIG. 2 is a cross-sectional view taken along line II-II in FIG. 1.

As shown in FIGS. 1 and 2, the optical connector 1 is comprised of a housing 3, a supporting member 5, a ferrule 7, and a divided sleeve 8.

Figure 3:
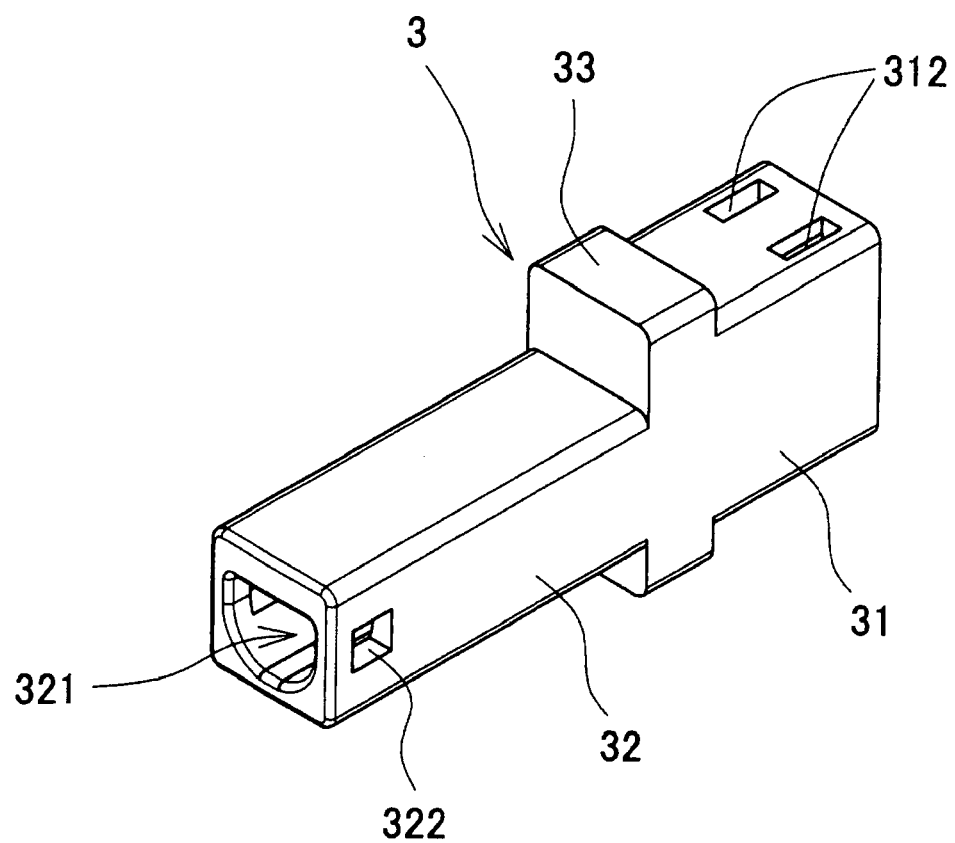
FIG. 3 is a perspective view of a housing of the optical connector shown in FIG. 1 as viewed from the rear.
Figure 4:
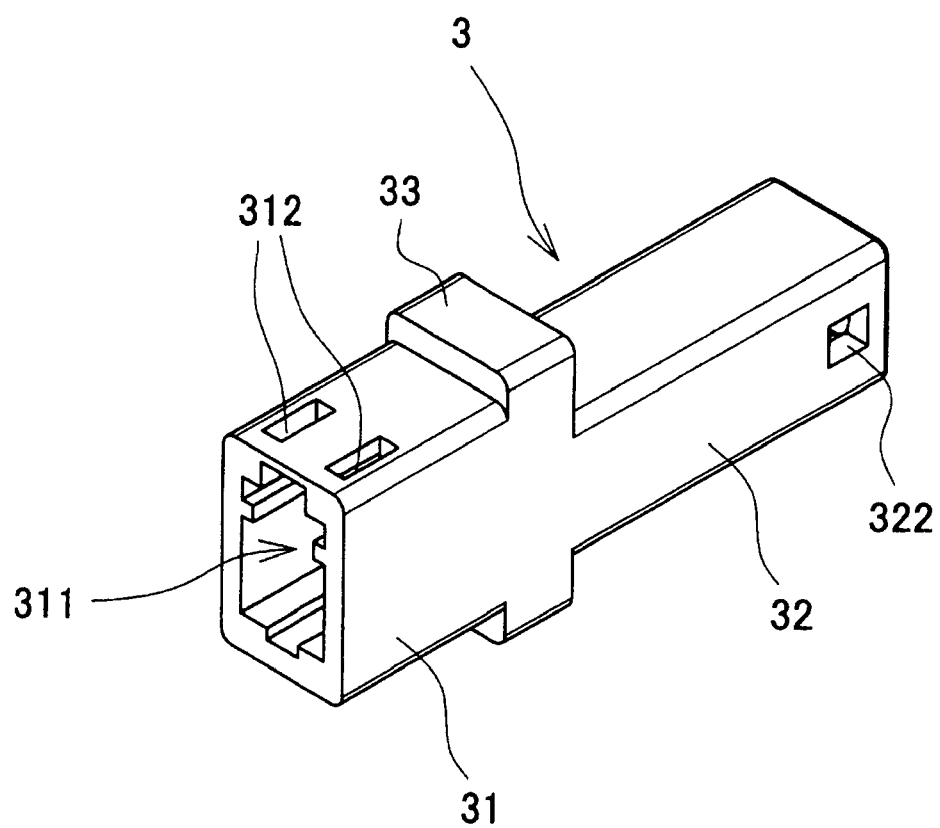
FIG. 4 is a perspective view of the housing of the optical connector shown in FIG. 1 as viewed from the front.
Figure 5:
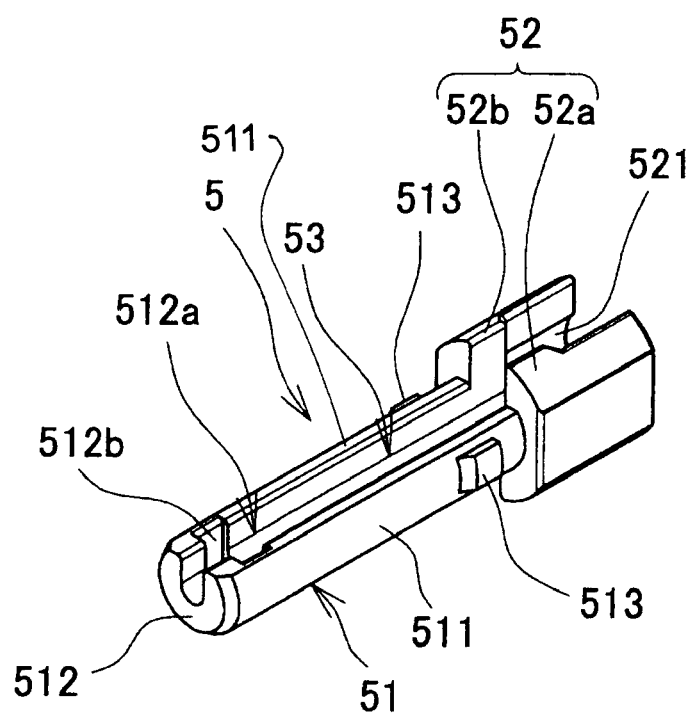
FIG. 5 is a perspective view of a supporting member of the optical connector shown in FIG. 1 as viewed from the front and above.
Figure 6:
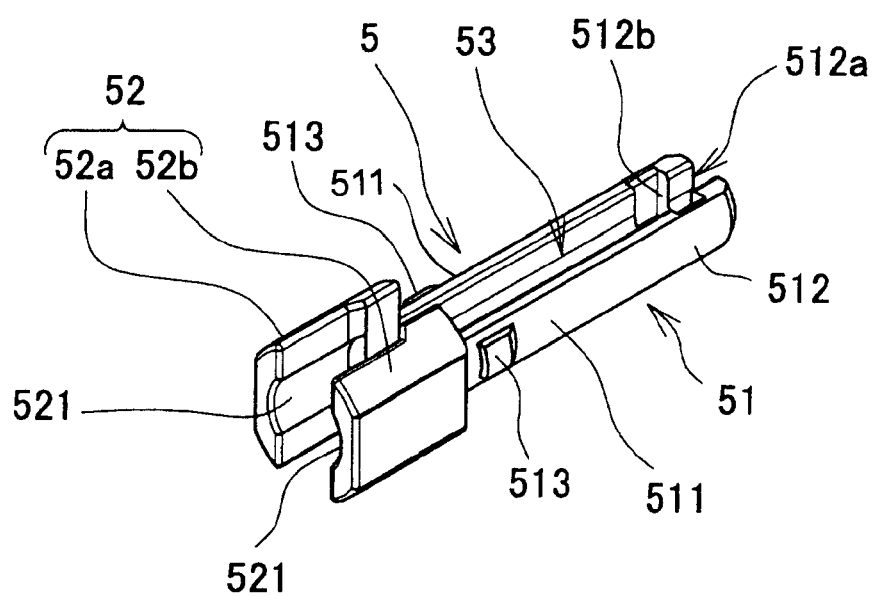
FIG. 6 is a perspective view of the supporting member of the optical connector shown in FIG. 1 as viewed from the rear.
Figure 7:
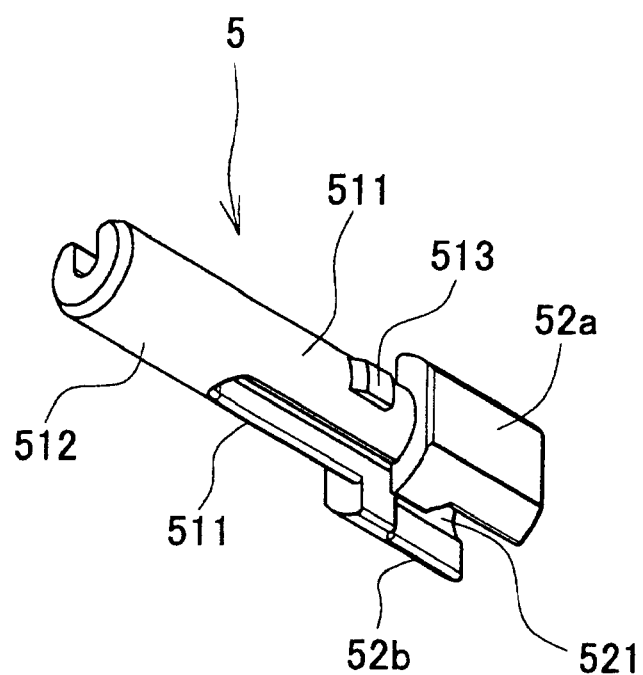
FIG. 7 is a perspective view of the supporting member of the optical connector shown in FIG. 1 as viewed from the front and bottom.
Figure 8:
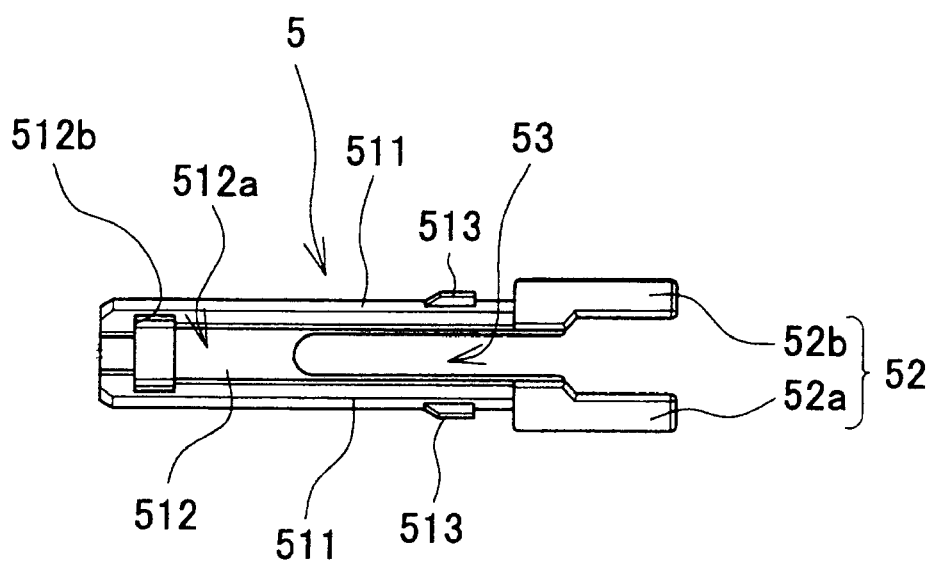
FIG. 8 is a plan view of the supporting member of the optical connector shown in FIG. 1.
Figure 9:
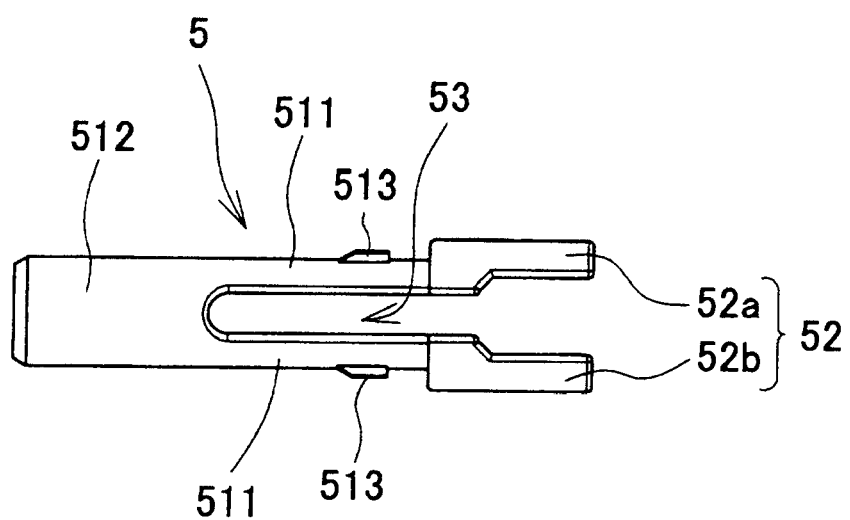
FIG. 9 is a bottom view of the supporting member of the optical connector shown in FIG. 1.

As shown in FIGS. 2, 3, and 4, the housing 3 includes a fitting portion 31 and a supporting member-receiving portion 32. The fitting portion 31 is in the form of a box having an opening, and has a receiving space 311 (see FIG. 2). The receiving space 311 receives a front end portion of a mating housing of a mating optical connector, not shown. The fitting portion 31 has an upper surface formed with locking holes 312. When the mating housing is inserted into the receiving space 311, locking lugs (not shown) formed on the mating housing are engaged with the locking holes 312, whereby the mating housing is locked to the fitting portion 31.

The supporting member-receiving portion 32 is substantially hollow prism-shaped, and has a receiving space 321. The supporting member 5 is inserted in the receiving space 321. The supporting member-receiving portion 32 has opposite side surfaces formed with through holes (hole) 322.

A portion 33 of the fitting portion 31 toward the supporting member-receiving portion 32 has a central part thereof formed with a through hole 34 (see FIG. 2).

As shown in FIGS. 2, 5, 6, 7, 8, and 9, the supporting member 5 includes a supporting member main body 51 and an operating portion 52. The supporting member 5 is formed of a resin having elasticity.

The supporting member main body 51 includes a pair of elastic deformation portions 511 and a connection portion 512. The elastic deformed portions 511 each are substantially plate-shaped, and are opposed to each other across an accommodating space 53. The connection portion 512 connects the pair of elastic deformation portions 511. The connection portion 512 is formed with a receiving portion 512a (see FIG. 2) for receiving the ferrule 7 therein. The receiving portion 512a is formed with a flange portion-accommodating portion 512b for accommodating a flange portion 721 of the ferrule 7, which prevents the flange portion 721 of the ferrule 7 from moving (moving in a direction of inserting and removing the supporting member 5).

The pair of elastic deformation portions 511 each have an outer surface formed with a protrusion 513. When the supporting member 5 is inserted in the supporting member-receiving portion 32 of the housing 3, the protrusion 513 is engaged with an associated one of the through holes 322 (see FIG. 3) of the housing 3. As a result, the supporting member 5 is locked to the housing 3, which prevents the supporting member 5 from being removed from the housing 3. The through holes 322 and the protrusions 513 form retaining means for preventing the supporting member 5 from being removed from the housing 3.

The operating portion 52 is formed by a pair of plate portions 52a and 52b, which are continuous with the elastic deformation portions 511. The plate portions 52a and 52b each have an inner surface formed with a recess 521. The recesses 521 are for preventing load from being applied to an optical fiber cord 11 when the plate portions 52a and 52b are pinched by fingers. When the supporting member 5 is inserted in the supporting member-receiving portion 32 of the housing 3, the plate portions 52a and 52b protrude out from the housing 3.

Figure 10:
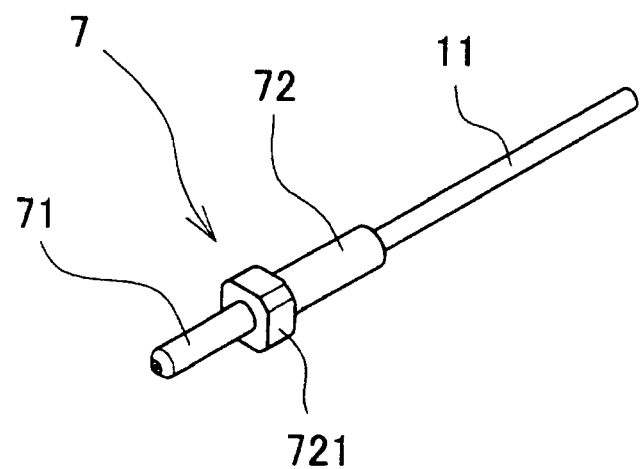
FIG. 10 is a perspective view of a ferrule and an optical fiber cord.

As shown in FIGS. 2 and 10, the ferrule 7 includes a ferrule body 71 and a holding member 72. The ferrule body 71 is substantially pipe-shaped, and is made of zirconia. An optical fiber wire 111 of the optical fiber cord 11 is inserted into the ferrule body 71. The optical fiber wire 111 is held by the ferrule body 71. The optical fiber cord 11 is formed by the optical fiber wire 111 and a sheath 112. Although in this embodiment, the optical fiber wire 111 is formed by a core (not shown) and a clad (not shown) which covers the core, the optical fiber wire includes ones having a primary coating (not shown) which covers a clad.

The holding member 72 is substantially pipe-shaped, and is made of a metal. The holding member 72 includes the flange portion 721 (see FIG. 10). The holding member 72 holds one end of the ferrule body 71. The optical fiber cord 11 is inserted into the holding member 72.

As shown in FIG. 2, the divided sleeve 8 is inserted in the through hole 34, and is supported by the housing 3. The ferrule 7 is brought into abutment with a mating ferrule of the mating optical connector, not shown, in the divided sleeve 8.

Next, a description will be given of operations for assembling the optical connector 1 with reference to FIGS. 11 to 13.

Figure 11:
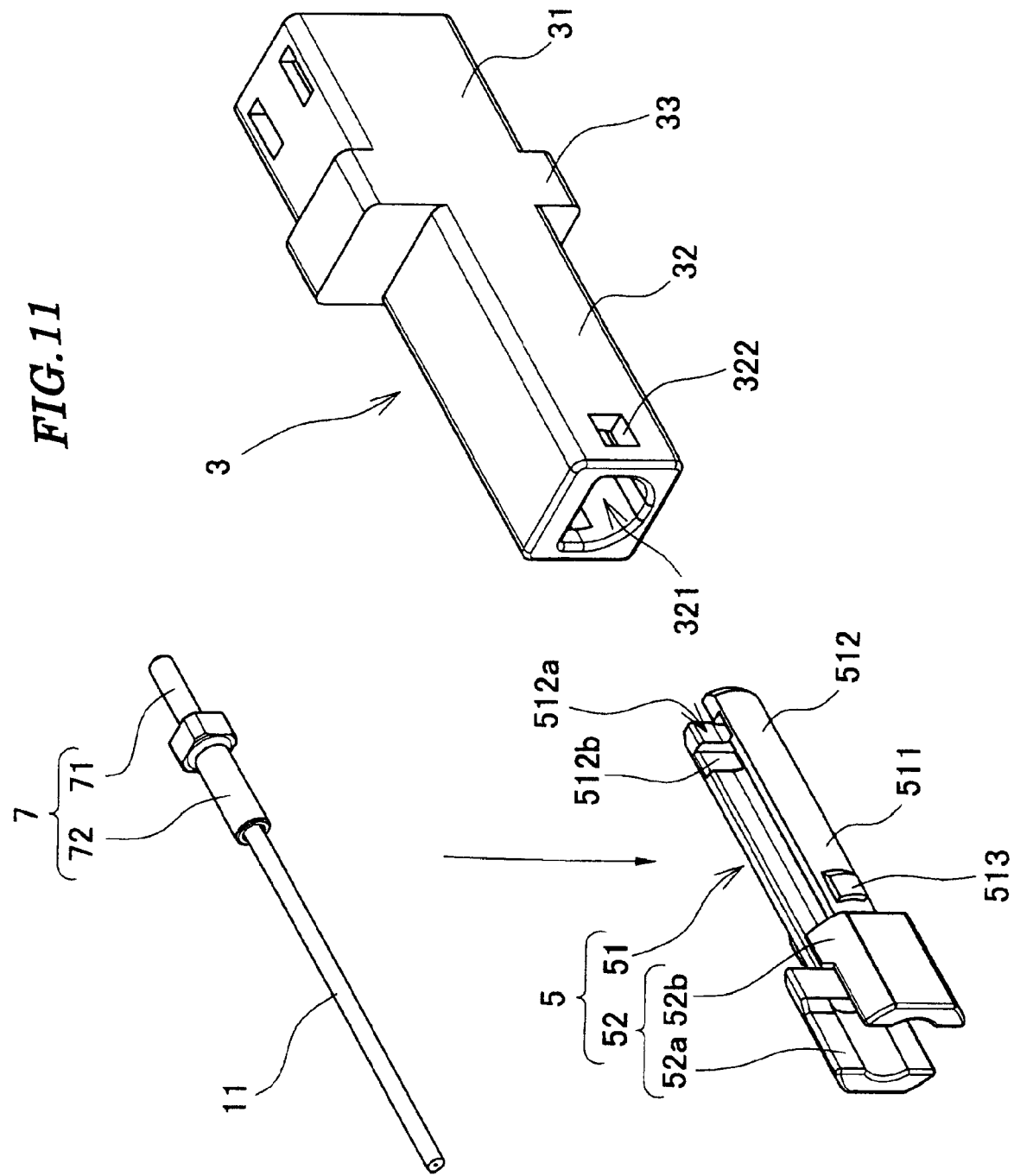
FIG. 11 is an exploded perspective view of the optical connector shown in FIG. 1.

First, as shown in FIG. 11, the ferrule 7 holding the optical fiber cord 11 is received into the receiving portion 512a of the connection portion 512 of the supporting member 5. At this time, the optical fiber cord 11 is arranged between the pair of elastic deformation portions 511, and between the pair of plate portions 52a and 52b.

Figure 12:
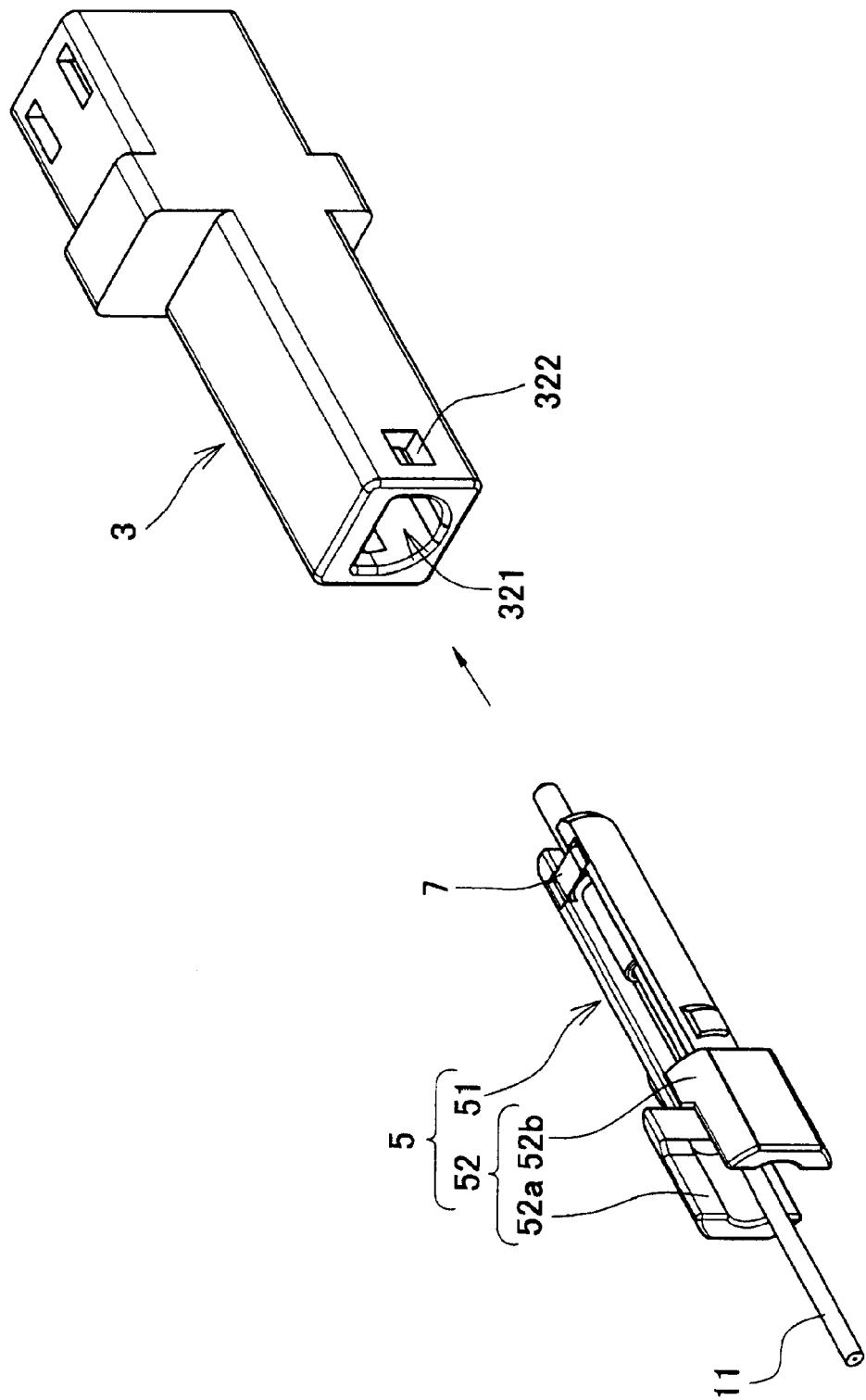
FIG. 12 is a perspective view of a state in which the supporting member supporting the ferrule and the optical fiber cord of the optical connector shown in FIG. 11 is about to be inserted into the housing.

Next, as shown in FIG. 12, the supporting member main body 51 of the supporting member 5 is inserted into the receiving space 321 of the housing 3. At this time, the pair of plate portions 52a and 52b are pinched by fingers to thereby flex the pair of elastic deformation portions 511 toward each other.

Figure 13:
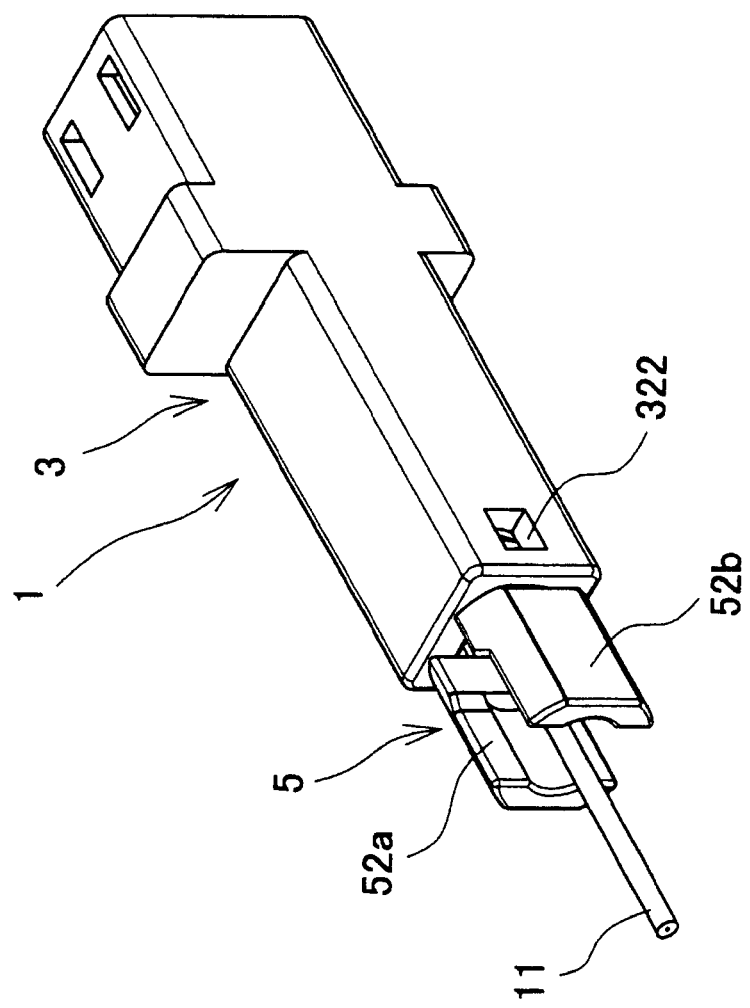
FIG. 13 is a perspective view of a state in which the supporting member shown in FIG. 12 is inserted into the housing.

As shown in FIG. 13, when the supporting member main body 51 of the supporting member 5 is inserted into the housing 3, the fingers are released from the plate portions 52a and 52b. As a result, the protrusions 513 are fitted in the through holes 322 of the hosing 3 by the spring force of the elastic deformation portions 511, whereby the supporting member 5 is made difficult to be removed from the housing 3. It should be noted that the supporting member main body 51 may be inserted into the receiving space 321 by pinching the pair of plate portions 52a and 52b by the fingers without flexing the pair of elastic deformation portions 511 toward each other. In this case, as the supporting member 5 is inserted into the receiving space 321, the protrusions 513 are urged by the inner wall surface of the receiving space 321 of the housing 3, whereby the pair of the elastic deformation portions 511 are flexed toward each other, and hence the supporting member main body 51 is received into the receiving space 321.

When the supporting member 5 is mounted in the housing 3, the ferrule 7 is prevented from moving in a radial direction of the ferrule 7 by the inner wall surface of the supporting member-receiving portion 32 of the housing 3. Further, when the optical fiber cord 11 is pulled, the flange portion 721 is prevented from moving in a direction of inserting or removing the supporting member 5, since the flange portion 721 of the ferrule 7 is accommodated in the flange portion-accommodating portion 512b of the supporting member 5. Therefore, the ferrule 7 is prevented from being removed from the supporting member 5.

Next, a description will be given of operations of disassembling the optical connector 1 with reference to FIGS. 13 to 15.

In a state illustrated in FIG. 13, first, the pair of plate portions 52a and 52b are pinched by fingers toward each other. When the plate portions 52a and 52b are pinched by the fingers, the elastic deformation portions 511 are flexed, whereby the protrusions 513 are removed from the through holes 322, which releases the fixed state of the supporting member 5 to the housing 3.

Figure 14:
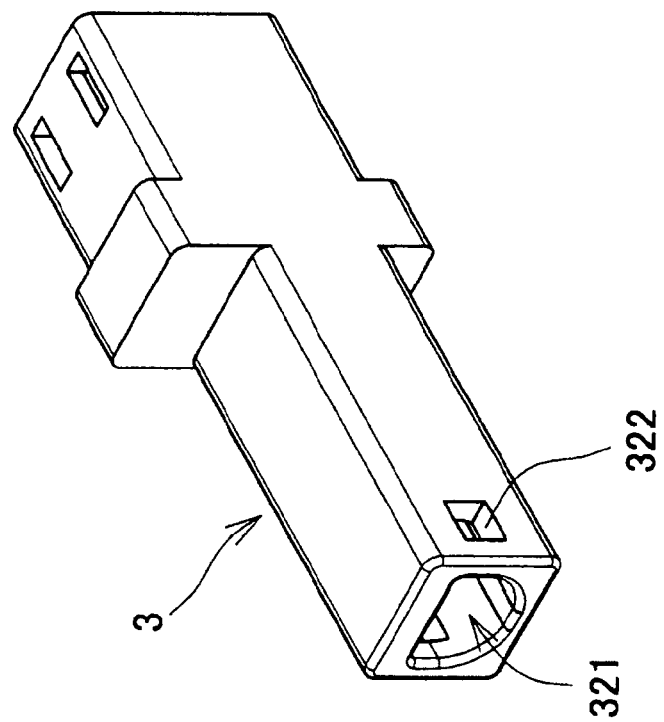
FIG. 14 is a perspective view of a state in which the supporting member is drawn out from the housing of the optical connector shown in FIG. 13.
Figure 14:
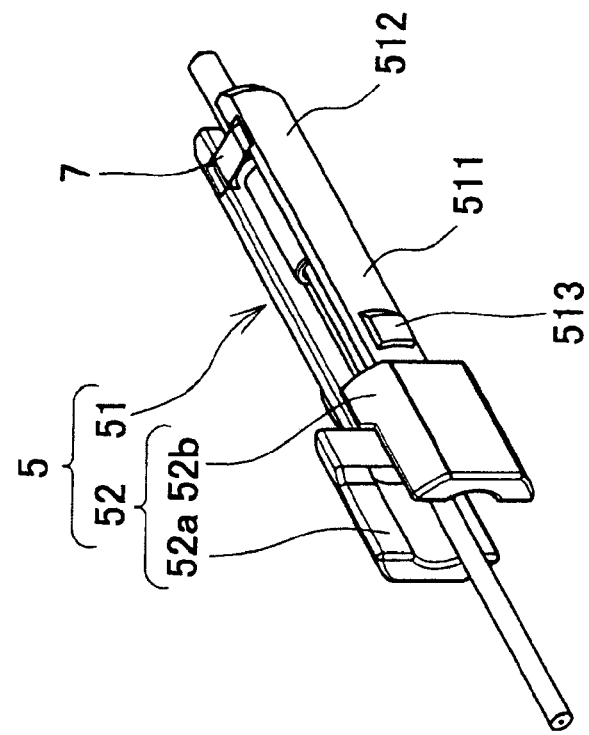

Next, as shown in FIG. 14, the supporting member 5 is drawn out from the receiving space 321 of the housing 3.

Figure 15:
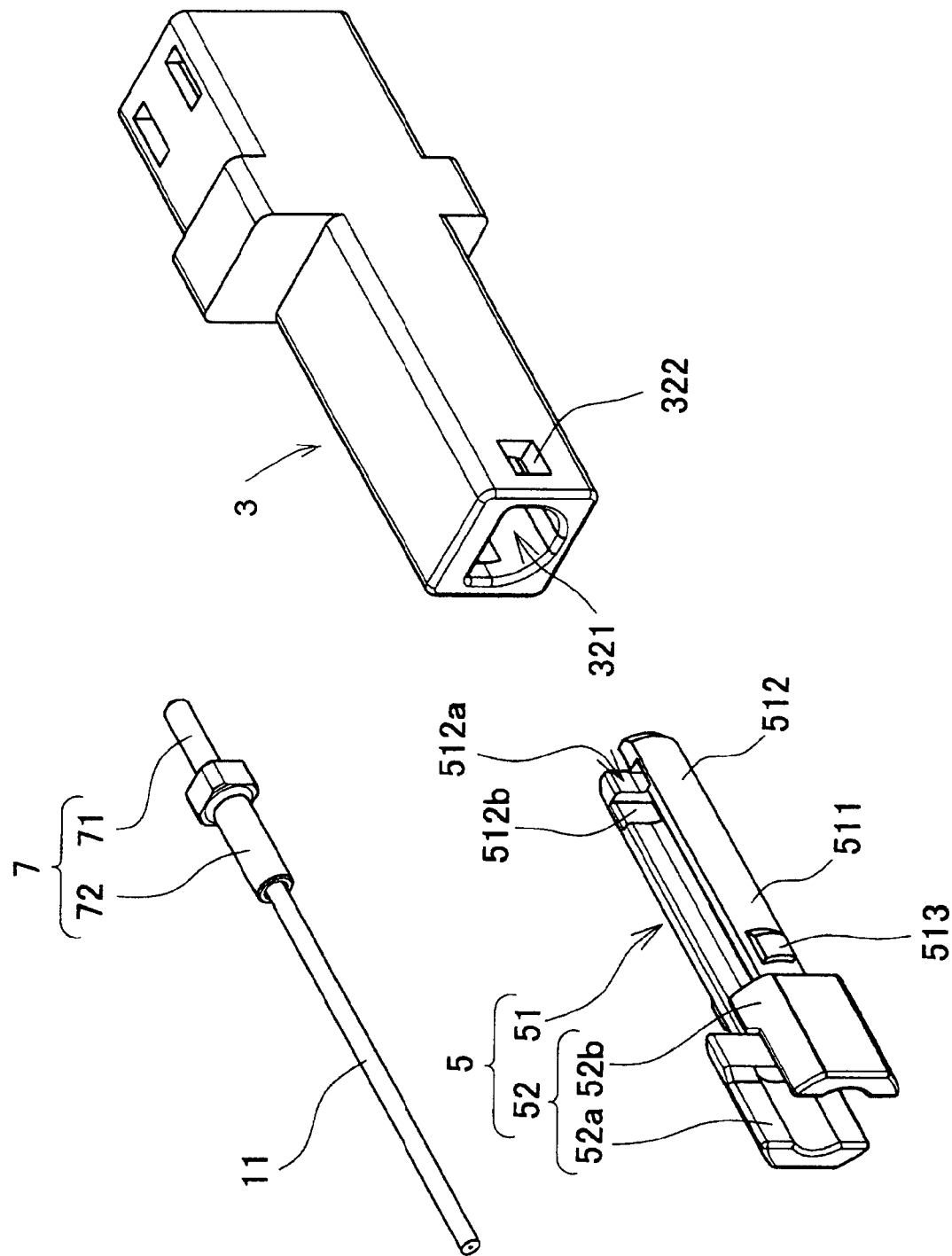
FIG. 15 is a perspective view of a state in which the ferrule and the optical fiber cord are removed from the supporting member of the optical connector shown in FIG. 14.

Finally, as shown in FIG. 15, the ferrule 7 is removed from the receiving portion 512a of the supporting member 5 in the radial direction thereof. Through the above-mentioned operations, disassembly of the optical connector 1 is completed.

According to this embodiment, only by pinching and pulling the operating portion 52 of the supporting member 5 by fingers, it is possible to release the engaged state between the housing 3 and the supporting member 5, and draw out the supporting member 5 from the housing 3. Therefore, without using a special jig, not shown, it is possible to easily remove the ferrule 7 from the housing 3 by an operator alone.

It should be noted that although in this embodiment, the protrusions 513 are formed on the supporting member 5, and the though holes 322 are formed in the housing 3, the protrusions may be formed on the housing 3, and the through holes may be formed in the supporting member 5.

Further, although in this embodiment, the fitting portion 31, the supporting member-receiving portion 32, and the portion 33 are integrally formed, the fitting portion 31 and the supporting member-receiving portion 32 may be separately formed, and joined by welding, gluing, or press-fitting.

It should be noted that although the optical connector 1 of this embodiment includes the divided sleeve 8, if the mating optical connector include a divided sleeve, the divided sleeve 8 is not necessary.

Further, the holes which form the retaining means are not necessarily required to be through holes, the holes may be non-through holes insofar as they are holes with which the protrusions 513 are engaged.

Next, a description will be given of an optical connector 201 according to a second embodiment of the present invention with reference to FIGS. 16 to 18.

Figure 16:
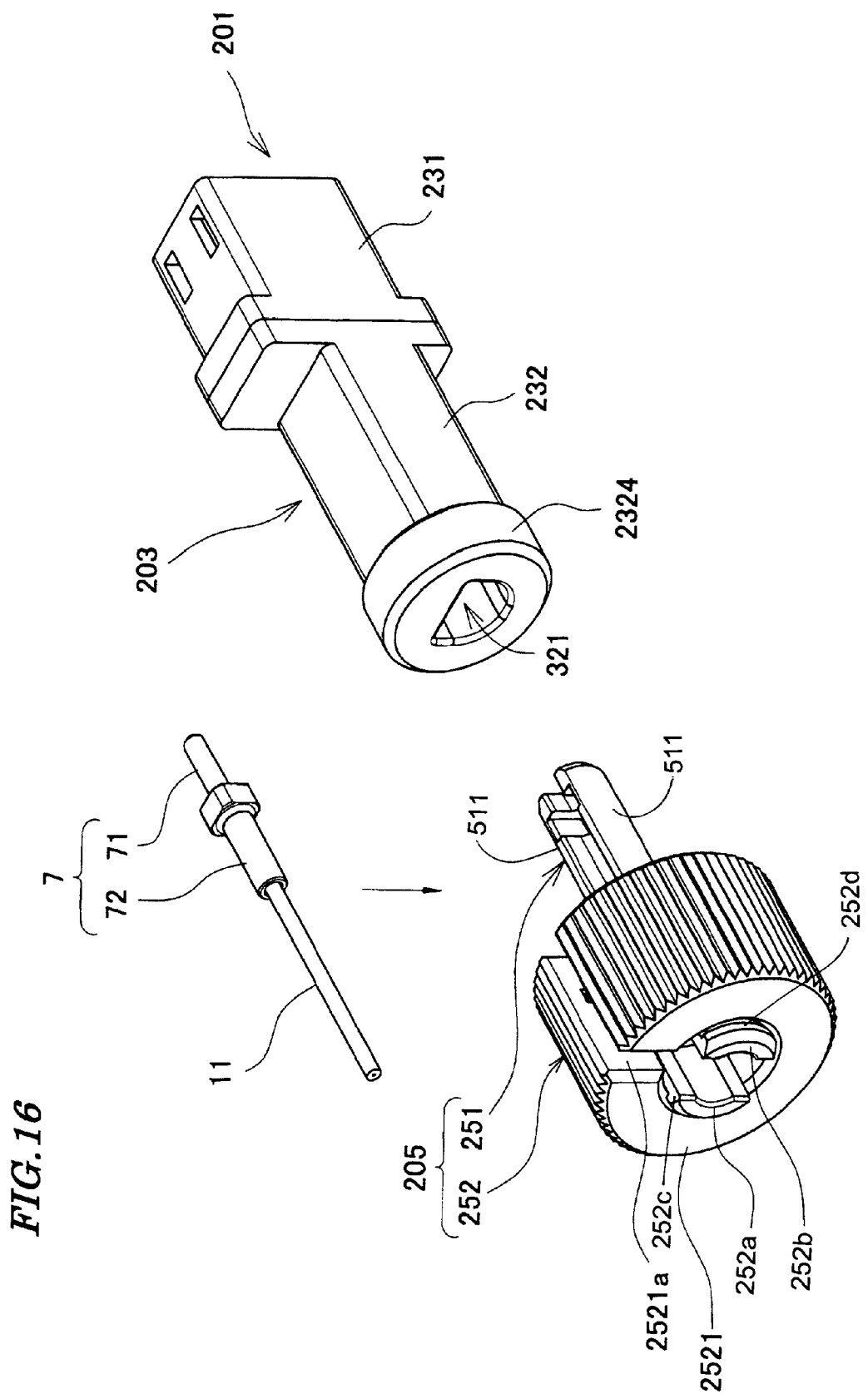
FIG. 16 is an exploded perspective view of an optical connector according to a second embodiment of the present invention.

As shown in FIG. 16, a housing 203 of the optical connector 201 of the second embodiment is comprised of a fitting portion 231 and a supporting member-receiving portion 232. The fitting portion 231 and the supporting member-receiving portion 232 are joined by welding, gluing or the like. One end portion of the supporting member-receiving portion 232 opposite from the other end portion thereof toward the fitting portion 231 is formed with a male screw portion 2324. Screw threads of the male screw portion 2324 are omitted in FIG. 16.

A supporting member 205 is formed by a supporting member main body 251 and an operating portion 252. Component parts identical to those of the optical connector according to the first embodiment are designated by identical reference numerals, and detailed description thereof is omitted.

The supporting member main body 251 includes the pair of elastic deformation portions 511, which are each formed with a protrusion, not shown, on an outer surface thereof. The operating portion 252 is formed by a pair of plate portions 252a and 252b, and an operation knob 2521. The pair of plate portions 252a and 252b include protrusions 252c and 252d, respectively. The operation knob 2521 has a substantially cylindrical shape, and includes a slit 2521a. The operation knob 2521 has an inner periphery surface formed with a female screw portion, not shown. The operation knob 2521 is mounted on the plate portions 252a and 252b in a manner capable of rotating about a central axis of the supporting member main body 251, and incapable of moving in a direction of the central axis of the supporting member main body 251. To mount the operation knob 2521 on the plate portions 252a and 252b, the slit 2521a is made wide, and the plate portions 252a and 252b are inserted in the operation knob 2521. Further, the operation knob 2521 is located between the protrusions 252c and 252d of the plate portions 252a and 252b, and the protrusions of the elastic deformation portions 511, whereby these protrusions prevent the operation knob 2521 from moving in the direction of the central axis of the supporting member main body 251.

When the female screw portion of the operation knob 2521 is screwed into the male screw portion 2324 of the housing 203, the supporting member 205 is prevented from being removed from the housing 203. In the second embodiment, the retaining means is formed by the female screw portion of the operating portion 252 and the male screw portion 2324 of the housing 203.

Next, a description will be given of an operation of assembling the optical connector 201 according to the second embodiment.

First, as shown in FIG. 16, the operation knob 2521 is rotated such that the slit 2521a of the operation knob 2521 mounted on the pair of plate portions 252a and 252b coincides with a gap between the pair of plate portions 252a and 252b in the radial direction of the operating portion 252.

Next, the ferrule 7 is mounted in the supporting member main body 251.

Figure 17:
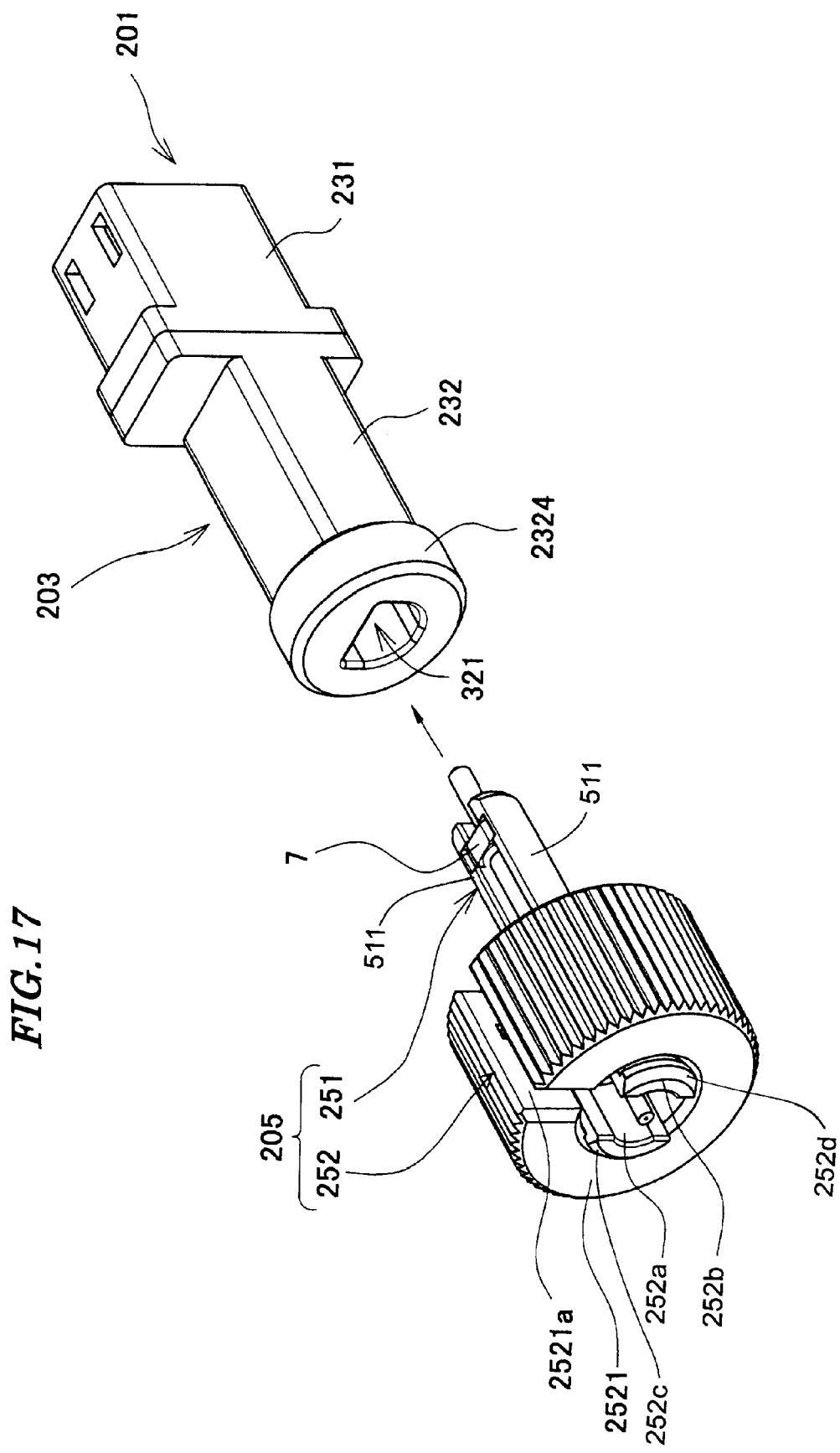
FIG. 17 is a perspective view of a state in which the supporting member supporting the ferrule of the optical connector shown in FIG. 16 is about to be inserted into a housing.

Thereafter, as shown in FIG. 17, the supporting member main body 251 in which the ferrule 7 is mounted is inserted into the receiving space 321 of the housing 203, and the operation knob 2521 is rotated clockwise to be screwed into the male screw portion 2324.

Figure 18:
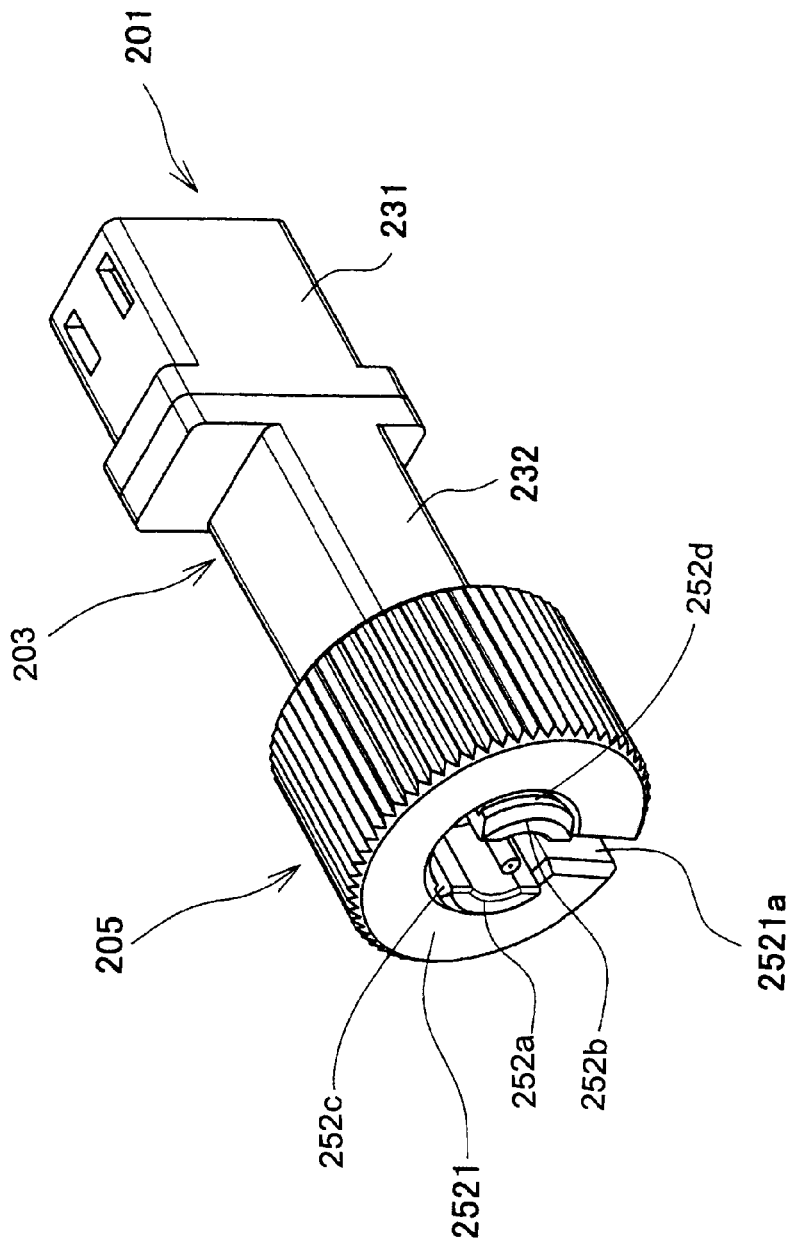
FIG. 18 is perspective view of a state in which the supporting member shown in FIG. 17 is inserted in the housing, and an operation knob is rotated a half turn.

Thus, the assembly of the optical connector 201 is completed as shown in FIG. 18.

On the other hand, to disassemble the optical connector 201, first, the operation knob 2521 is rotated counterclockwise to remove the operation knob 2521 from the male screw portion 2324.

Next, the supporting member 205 is drawn out from the housing 203.

Finally, the operation knob 2521 is rotated such that the slit 2521a of the operation knob 2521 coincides with the gap between the pair of plate portions 252a and 252b in the radial direction of the operating portion 252, and the ferrule 7 is removed from the supporting member main body 251.

Thus, the disassembly of the optical connector 201 is completed.

According to the second embodiment, it is possible to obtain the same advantageous effects as provided by the first embodiment of the present invention.

It is further understood by those skilled in the art that the foregoing are the preferred embodiments of the present invention, and that various changes and modification may be made thereto without departing from the spirit and scope thereof.

What is claimed is:

1. An optical connector comprising:
 a housing that is connected to a mating optical connector;
 a supporting member that is mounted in said housing in a manner capable of being inserted and removed in a state in which a ferrule which holds an optical fiber wire is held therein, said supporting member including a supporting member main body which is accommodated in said housing, and an operating portion which is provided on said supporting member main body, and temporarily disables a retaining function of said retaining means; and
 retaining means for preventing said supporting member main body from being removed from said housing when said supporting member main body is accommodated in said housing;
 wherein when said supporting member is accommodated in said housing, said operating portion protrudes out from said housing; and
 wherein said retaining means comprises protrusions which are formed on said housing in a manner protruding toward said supporting member main body, and holes which are formed in said supporting member main body and are engageable with said protrusions.

2. The optical connector as claimed in claim 1, wherein:
 said supporting member main body comprises a pair of elastic deformation portions which are opposed to each other across a receiving space for receiving an optical fiber cord and which are elastically deformable in a direction toward each other, and a connection portion which receives said ferrule and connects said pair of elastic deformation portions to each other;
 a set of said holes is formed in said pair of elastic deformation portions;
 a set of said protrusions is formed on said housing; and
 said operating portion comprises a pair of plate portions which are continuous with said pair of elastic deformation portions.

3. The optical connector as claimed in claim 2, wherein said connection portion comprises an accommodating portion for accommodating a flange portion of said ferrule, said accommodating portion preventing said flange portion from moving in a direction of inserting or removing said supporting member.

* * * * *